Nov. 17, 1942.   G. B. SAYRE   2,302,351
CONTROL MECHANISM FOR PART-REVOLUTION SHAFTS
Filed April 20, 1940   3 Sheets-Sheet 2
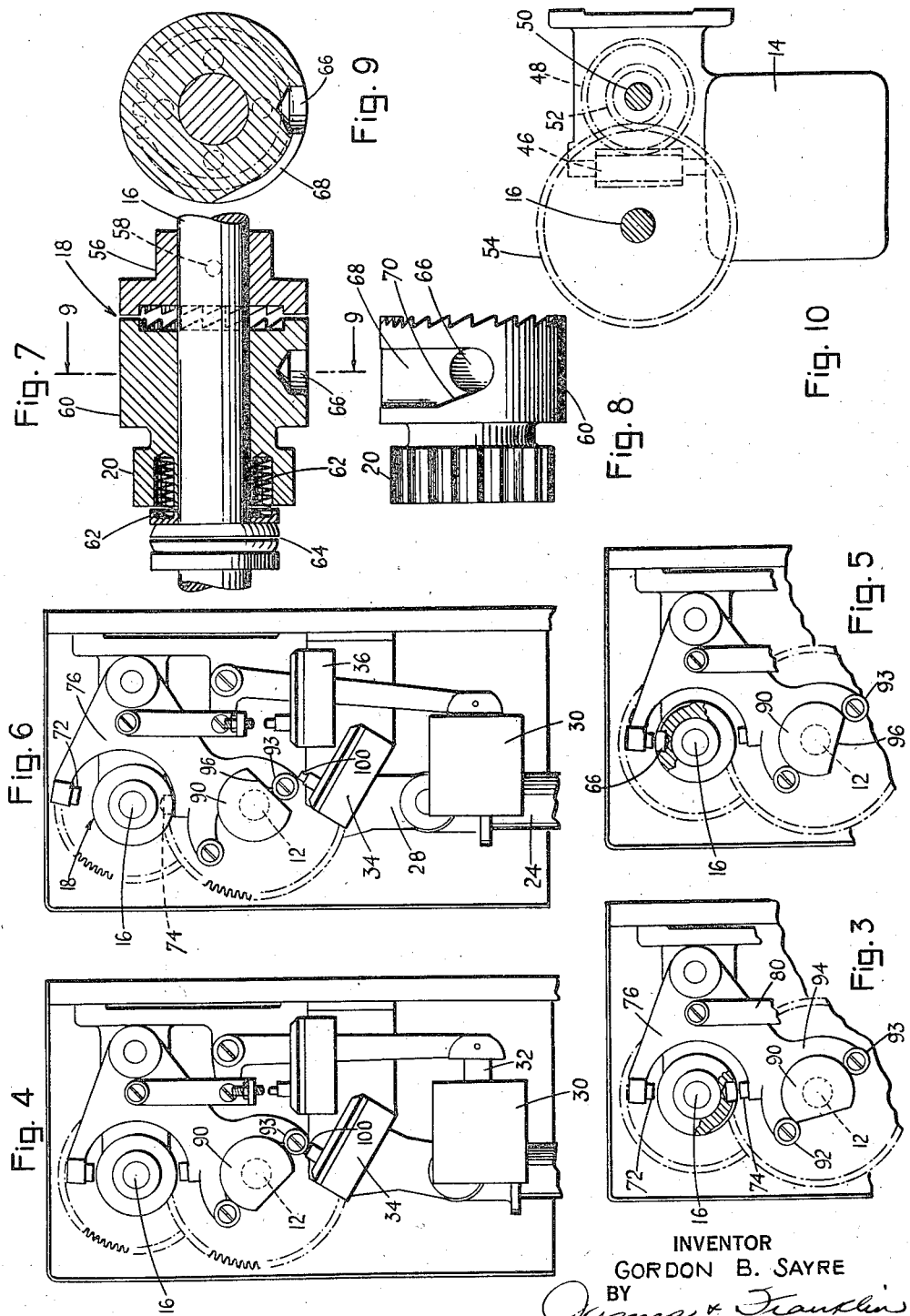
INVENTOR
GORDON B. SAYRE
BY
James & Franklin
ATTORNEYS Nov. 17, 1942.   G. B. SAYRE   2,302,351
CONTROL MECHANISM FOR PART-REVOLUTION SHAFTS
Filed April 20, 1940   3 Sheets-Sheet 3

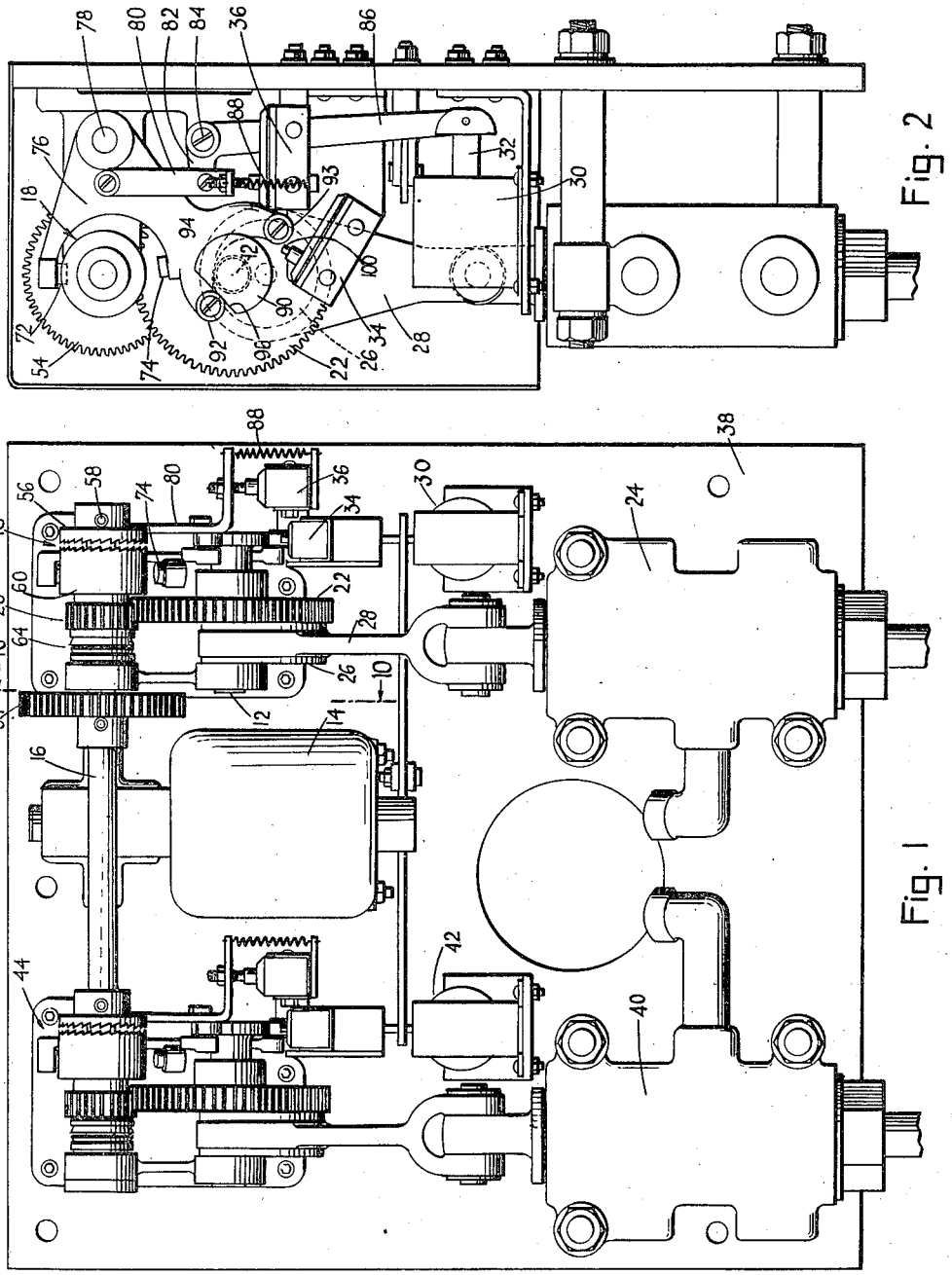

INVENTOR
GORDON B. SAYRE
BY
ATTORNEYS

Patented Nov. 17, 1942

2,302,351

UNITED STATES PATENT OFFICE 2,302,351

CONTROL MECHANISM FOR PART-REVOLUTION SHAFTS

Gordon B. Sayre, Boonton, N. J., assignor to Boonton Molding Company, Boonton, N. J., a corporation of New Jersey Application April 20, 1940, Serial No. 330,670

7 Claims. (Cl. 192—142)

This invention relates to control mechanisms, and more particularly to such a mechanism for establishing either of two positions of a shaft.

The primary object of my invention is to provide for control of a part-revolution shaft, most commonly a half-revolution shaft. The shaft is preferably driven by a motor through appropriate reduction gearing, to develop considerable torque, and may be used to effect a reciprocatory movement, as by the use of an eccentric or crank. Thus, the immediate object of the mechanism may be for the control of a valve, a switch, a pillboard closer used in a molding machine, semaphore or like signalling mechanisms, and other such uses.

Further objects of the invention are to arrange for remote control, and to devise a control mechanism which makes it impossible for the two different positions of the shaft or reciprocatory unit to get out of step or to become confused. The control is preferably obtained through an electric circuit embodying magnetic means at the control mechanism, and a remote switch for opening or closing the circuit. In accordance with the present invention, energization of the circuit invariably turns the part-revolution shaft to one of its two positions, and deenergization of the circuit invariably turns the part-revolution shaft to the other of its two positions.

The mechanism is such that the driving motor may be continuously operated, for it is effective only during engagement of an automatically self-disengaging clutch. When the operations occur frequently, or when the rotation of the motor may be used to serve some other useful purpose, the motor may be run continuously. However, when the operation of the motor is rather infrequent, it may be preferred to operate the same only when the position of the part-revolution shaft is to be changed, and a further object of the present invention is to suitably arrange one or more motor switches in the motor circuit for this purpose.

A further object of the invention is to devise control mechanism by which one or more of a considerable number of valves or other devices may be independently controlled from a single driving motor. The invention is shown applied to two control stations for a pair of valves, one of which may, for example, control the closing or opening of a pill press, and the other of which may control the operation of a suitable ejector means for the press. However, a much larger number of control devices or control stations may be independently operated by a single driving motor. In accordance with a further object of the invention, a single master switch may be provided for emergnecy use, said switch causing all of the control mechanisms to move to a predetermined or normal position. In the case of valves, for example, this may correspond to closing of all pressure valves and opening of all relief valves.

To the accomplishment of the foregoing and other more specific objects which will hereinafter appear, my invention consists in the control elements and their relation one to the other, as hereinafter are more particularly described in the specification and sought to be defined in the claims. The specification is accompanied by drawings, in which:

Fig. 1 is a front elevation of a control mechanism embodying features of the present invention as applied to the control of a pair of slide valves for a pill press;

Fig. 2 is a side elevation of the same;

Figs. 3, 4, 5 and 6 are partial side elevations showing successive positions in the operation of the control mechanism;

Fig. 7 is a longitudinal section through a self-disengaging clutch forming a part of the control mechanism;

Fig. 8 is a side elevation of the driven part of the clutch;

Fig. 9 is a section taken in the plane of the line 9—9 of Fig. 7;

Fig. 10 is a schematic showing of the motor drive gearing, looking in the plane of the line 10—10 of Fig. 1;

Figure 11:
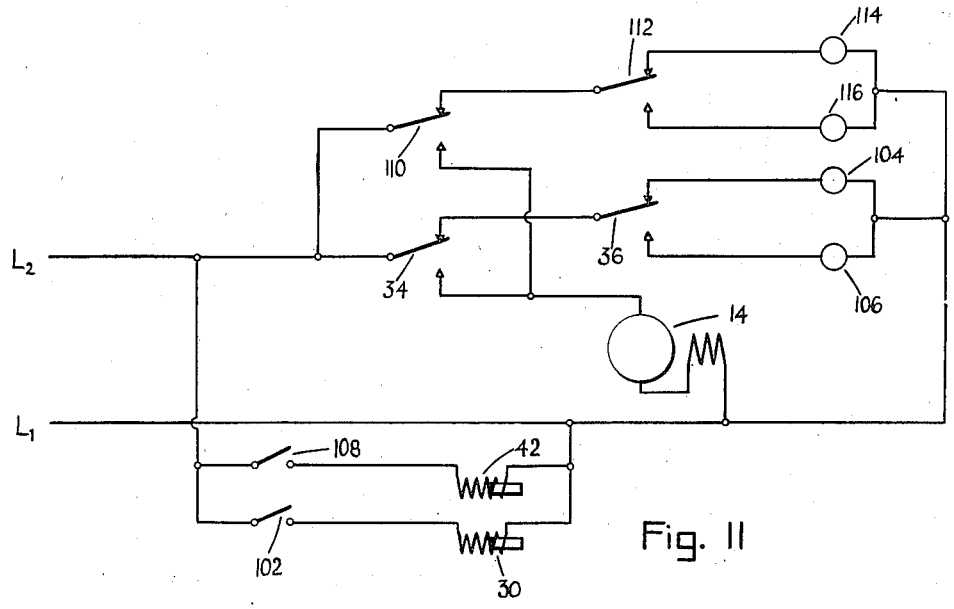
Fig. 11 is a wiring diagram for the apparatus shown in the preceding figures.

Referring to the drawings, and more particularly to Figs. 1 and 2, the mechanism comprises a part-revolution shaft 12, a motor 14 driving a motor-driven shaft 16, and means including a self-disengaging clutch 18 and reduction gearing 20, 22, for coupling the drive shaft 16 to the part-revolution shaft 12.

The part-revolution shaft may be used as a half-revolution shaft to establish either of two positions of a reciprocatory device. In the present case, the part-revolution shaft controls an hydraulic valve 24 of the slide or piston type, said valve controlling pressure and relief lines for an hydraulically operating device, as, for example, the head of a pill press. The valve is moved by means of an eccentric 26 on half-revolution shaft 12, and a connecting rod 28.

The operation of clutch 18 is controlled by means of a solenoid 30 acting on a core or plunger 32. The solenoid circuit is itself controlled by any suitable switch, and, as will later appear, the two positions of the valve or of the half-revolution shaft are made unmistakably distinguishable in that one of these positions is effected and maintained whenever the solenoid remains energized, and the other is effected and maintained whenever the solenoid is deenergized.

If desired, the apparatus may also be provided with a motor switch 34 for energizing the motor 14 only when a change in the position of the half-revolution shaft is to be made. Another switch 36 may be provided, if desired, to control suitable indicator lamps for at all times indicating the position of the half-revolution shaft (or in this case, of the valve).

Looking at Fig. 1, it will be seen that the apparatus so far described at the right-hand side of the base or panel 38 is substantially duplicated at the left-hand side of the panel. In this way another device such as the slide valve 40 may be similarly and independently controlled by its own associated solenoid 42, although the power for shifting the valve may be obtained from the aforesaid drive motor 14. Many such control stations may be added, as required in any particular case, the motor 14 merely driving the main drive shaft 16, and this having a series of self-disengaging clutches spaced therealong, such as the clutches 18 and 44, here illustrated. A part-revolution shaft and its associated mechanism is located at each of the clutches.

Referring now to Figs. 1 and 10, the motor 14 preferably drives shaft 16 through high ratio reduction gearing in order to develop adequate torque. Specifically, motor 14 turns a worm 46 meshing with a worm gear 48 secured to a countershaft 50. This drives a pinion 52 meshing with a gear 54 mounted on shaft 16. The motor 14 and shaft 16 may, if desired, run continuously.

Referring now to Figs. 7, 8 and 9, the shaft 16 carries the driving portion 56 of clutch 18. This is keyed to shaft 16, as by means of pin 58. The driven part 60 of the clutch is urged axially into engagement with the driving part 56 by suitable means, such as the small compression springs 62 reacting against a suitable thrust ball bearing 64. Pinion 20 is here shown formed integrally with driven clutch part 60, the resulting slight axial movement of the pinion being disregarded, because the teeth are of ample width to accommodate such movement.

The driven clutch part 60 is provided with a stop hole 66 intended to receive a stop pin and to thereby lock the pinion 20 in desired position. A cam groove 68 leads to the hole 66, and includes a helical cam surface 70 for causing axial movement of the driven clutch part 60 when the stop pin bears against the cam surface 70. The axial movement is in such direction as to disengage the clutch.

Referring now to Figs. 1 and 2, the clutch 18 cooperates with two diametrically opposed stop pins 72 and 74, these being carried on a clutch yoke 76 pivoted at 78. The clutch yoke 76 is arranged to be moved by a link 80 the lower end of which is connected to one arm 82 of an angle lever pivoted at 84. The other arm 86 of the angle lever is connected at its lower end to the solenoid plunger 32. The linkage is normally urged downwardly, as by means of a tension spring 88. This spring is shown in Figs. 1 and 2, but omitted in the other figures of the drawings.

When the solenoid 30 is deenergized, the clutch yoke 76 is drawn downwardly, and the clutch is locked by means of the upper stop pin 72. When solenoid 30 is energized, as is shown in Fig. 6, the clutch yoke 76 is moved upwardly, thereby disengaging stop pin 72 and freeing the clutch for rotation. Reverting now to Figs. 1 and 2, the pinion 20 and gear 22 are so related as to produce a one-to-three reduction ratio. A half revolution of the part-revolution shaft 12 therefore corresponds to one and one-half revolutions of pinion 20. I accordingly provide means to prevent premature disengagement of the clutch 18. This means consists of a cam 90 and diametrically opposed cam followers 92, 93 preferably carried on a cam follower yoke 94. The cam follower yoke 94 is connected to the clutch yoke 76 for simultaneous movement, and in the present case, this is done by forming the yokes integrally, the combined yoke being pivotally mounted at 78 and being moved by link 80. The cam 90 is so arranged as to prevent disengagement of clutch 18 at the half revolution and at the full revolution points, and to permit disengagement only after the desired one and one-half revolutions, at which time the clutch is locked, thereby locking the valve in its other extreme position.

The reduction gear is desirable as the clutch must be disengaged under load, and the reduction gear reduces the load. For some purposes a much higher reduction may be desired. In one case, where a very heavy part is being moved, I have used a ratio of 15 to 1.

The manner in which this is accomplished will be clear from a comparison of the successive Figures 2 through 6 of the drawings. In Fig. 2, the solenoid 30 is deenergized; the yoke 76 is down; the stop pin 72 locks the clutch; and cam follower 92, 93 rests against the flat or cut-away portion 96 of cam 90, thus permitting the full downward movement of the yoke.

In Fig. 3 the energization of the solenoid has attempted to raise the link 80 and yokes 94 and 76. The yokes have, however, moved upwardly only half-way, this being enough to disengage stop pin 72 and to thereby release or engage the clutch, but not enough to cause the lower stop pin 74 to disengage the clutch. The upward movement of the yoke is prevented by the action of cam 90 on the cam follower 93. At this time the drive shaft 16 has turned a half revolution, and the half-revolution shaft has turned sixty degrees. In Fig. 4, the same condition is maintained, the solenoid 30 having attracted the solenoid core 32 about half-way in, and the double yoke having been raised about half-way, further movement being prevented by the action of cam 90 on cam follower 93. At this time the drive shaft 16 has turned three-fourths of a revolution, and the part-revolution shaft 12 has turned ninety degrees.

Referring now to Fig. 5, the double yoke is still in the same position, and for the same reasons. At this time, the drive shaft 16 has turned through one full revolution, and the part-revolution shaft 12 has turned through one-third of a revolution. It will be noted, however, that the flat 96 on cam 90 has now approached the cam follower 93, and any further movement of the cam will permit completion of the upward movement of the double yoke.

Referring now to Fig. 6, the flat 96 on cam 90 has reached cam follower 93, thereby permitting upward movement of the double yoke. The stop pin 74 has caused axial disengagement of the clutch and has locked the clutch by entering the mating clutch hole. The inward movement of the solenoid core has been completed. The part-revolution shaft 12 has turned exactly one-half of a revolution, and is locked in that position. At this time the eccentric on shaft 12 has moved the eccentric rod 28 to its uppermost position, and has consequently shifted the position of the slide valve 24.

As so far described, it has been assumed that the motor 14 and drive shaft 16 are operating continuously. This is not necessary. The motor may be put into operation solely during a change of position of the half-revolution shaft. Referring to Fig. 2, it will be seen that motor switch 34 is operated by a plunger 100. This is shown in its outer position, corresponding to the open position of the switch.

Referring now to Fig. 4, it will be seen that the initial or partial upward movement of the yoke brings the cam follower 93 into engagement with the switch plunger 100 and so depresses the plunger, thereby closing the motor switch 34. The motor then starts, and continues its operation until plunger 100 is again released.

Referring now to Fig. 6, it will be seen that this takes place when the upward movement of the double yoke is completed, for the cam follower 93 then rolls past the plunger 100 and permits it to move upwardly, so that the motor switch 34 is again opened.

The effect of this may be seen in the wiring diagram of Fig. 11. Current is supplied at terminals L1, L2. The driving motor is indicated at 14. When motor switch 34 is in the upward position shown, the motor is deenergized. When the switch blade is moved to downward position, as upon depression of the plunger 100 (Fig. 4), the motor is energized and remains so until the switch 34 is again raised to upward position.

The solenoid is indicated at 30. It is controlled by any suitable (and ordinarily remote) switch 102. When switch 102 is closed the solenoid is energized and the half-revolution shaft is put in one of its two positions. When the switch 102 is opened, the solenoid is deenergized and the half-revolution shaft is put in the opposite position.

Reference is next made to the switch 36. This is closed downwardly when the yoke is in downward position, as is shown in Fig. 2. It is moved upwardly when the yoke is in upward position, as is shown in Fig. 6. The switch 36 controls indicator lamps 104 and 106, shown in Fig. 11. One of these may be red and the other green, the red lamp ordinarily corresponding to the open position of the valve, and the green lamp corresponding to its closed position. When the motor switch 34 is depressed, as it is during operation of motor 14, both lamps are extinguished, thus indicating that the valve is in an intermediate position or in the course of movement from one position to the other.

The additional parts shown in Fig. 11 are wiring corresponding to the second control station. Thus the solenoid 42 is controlled by a switch 108. The resulting movement of the solenoid core changes the motor switch 110 to downward position, thereby energizing the motor 14. The motor switches 34 and 110 are simply connected in parallel and either one is adapted to energize the motor. The indicator lamp switch 112 and the indicator lamps 114 and 116 all correspond to the parts previously described, but are used for the second control station.

Figure 12:
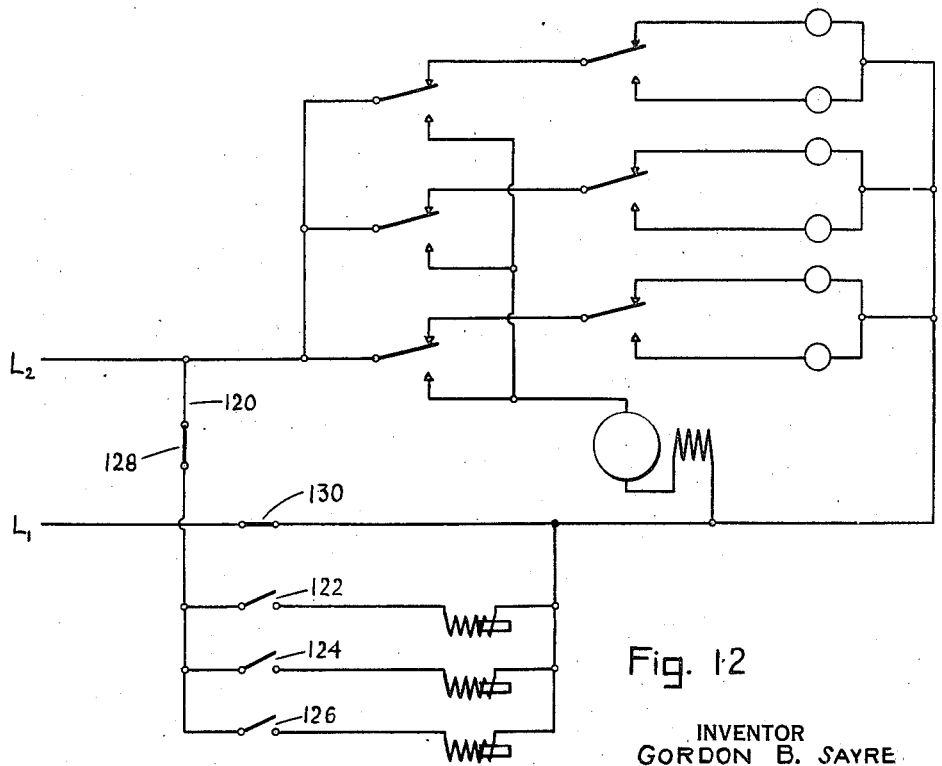
Fig. 12 is a wiring diagram explanatory of a modification.

Referring now to Fig. 12, I illustrate a slight modification of the invention. One change is the showing of three control stations, and it will be understood that as many more control stations may be used as desired, all of these being arranged in parallel. A second change is that the common supply line 120 for the solenoid switches 122, 124 and 126 is provided with a normally closed master switch 128. Normally each of the control stations is independently controlled by its own switch. However, in an emergency the master switch 128 may be opened, thereby causing all of the control stations to simultaneously return to a desired "home" position or normal position, which ordinarily will be selected as a safe position. For example, with hydraulic valves the normal position will correspond to closing of pressure lines and opening of relief lines. Still another change is the use of the switch 130. This may be used if the valves are to be left "off normal" for a long time, and so saves waste of current. The switches 122—126 are set as desired, and then switch 130 is opened. When switch 130 is closed the shaft will run but then leaves the valves in desired relation. To get back to normal, instead, it is merely necessary to close switch 130 and open switch 128.

It is believed that the construction and operation, as well as the many advantages of my improved control mechanism, will be apparent from the foregoing detailed description thereof. It will also be apparent that while I have shown and described my invention in a preferred form, many changes and modifications may be made in the structure disclosed, without departing from the spirit of the invention as sought to be defined in the following claims. For example, while I have referred to the reduction ratio between the clutch and the half-revolution shaft as being one-to-three, it may be any odd integer as, for example, one-to-five, or one-to-seven, in which case the revolutions of the clutch will be two and one-half or three and one-half, respectively, instead of one and one-half, as specifically described above. In the appended claims, therefore, the reference to a gear ratio of one-to-three is not intended to exclude equivalent odd integer ratios, such as one-to-five, or one-to-seven, the ratio of one-to-three being named merely for convenience of reference.

I claim:

1. A driving shaft, a clutch thereon, a pinion secured to the driven part of the clutch, a half-revolution shaft, a gear on said shaft meshing with said pinion in a desired reduction ratio, diametrically opposed pins for cooperating with said clutch, a cam on said half-revolution shaft, diametrically opposed cam followers, said cam followers and clutch pins being arranged to move together, a solenoid having a plunger connected to said clutch pins and cam followers whereby when the solenoid is energized said parts tend to move in one direction to disengage one clutch pin and to engage the other, the cam preventing such engagement until the driving shaft has turned enough to turn the half-revolution shaft through one-half revolution, whereupon the clutch is disengaged and locked, de-energization of said solenoid causing return movement of the parts until the clutch is again disengaged after enough rotation to turn the half-revolution shaft through one-half revolution, whereby the half-revolution shaft may be put in either of its two positions by making or breaking a remote control circuit.

2. A driving shaft, a clutch thereon, a pinion secured to the driven part of the clutch, a half-revolution shaft, a gear on said shaft meshing with said pinion in one-to-three ratio, diametrically opposed pins for cooperating with said clutch, a cam on said half-revolution shaft, diametrically opposed cam followers, said cam followers and clutch pins being arranged to move together, a solenoid having a plunger connected to said clutch pins and cam followers whereby when the solenoid is energized said parts tend to move in one direction to disengage one clutch pin and to engage the other, the cam preventing such engagement until the driving shaft has turned one and one-half revolutions, whereupon the clutch is disengaged and locked, de-energization of said solenoid causing return movement of the parts until the clutch is again disengaged after one and one-half revolutions, whereby the half-revolution shaft may be put in either of its two positions by making or breaking a remote control circuit.

3. A driving shaft, a clutch thereon, a pinion secured to the driven part of the clutch, a half-revolution shaft, a gear on said shaft meshing with said pinion in one-to-three ratio, a clutch yoke with diametrically opposed pins for cooperating with said clutch, a cam on said half-revolution shaft, a cam follower yoke with diametrically opposed cam followers, said yokes being arranged to move together, a solenoid having a plunger connected to said yokes whereby when the solenoid is energized said yokes tend to move in one direction to disengage one clutch pin and to engage the other, the cam preventing such engagement until the driving shaft has turned one and one-half revolutions, whereupon the clutch is disengaged and locked, de-energization of said solenoid causing return movement of the yokes until the clutch is again disengaged after one and one-half revolutions, whereby the half-revolution shaft may be put in either of its two positions by making or breaking a remote control circuit.

4. A driving shaft, a clutch thereon, a pinion secured to the driven part of the clutch, a half-revolution shaft, a gear on said shaft meshing with said pinion in a desired odd-integer reduction ratio, diametrically opposed pins for cooperating with said clutch, a cam on said half-revolution shaft, diametrically opposed cam followers, said cam followers and clutch pins being arranged to move together, control means connected to said clutch pins and cam followers to disengage one clutch pin and then to engage the other, the cam cooperating with the cam followers to permit such disengagement but to prevent such engagement until the driving shaft has turned enough to turn the half-revolution shaft through one-half revolution, whereupon the clutch is disengaged and locked, reverse movement of said control means causing return movement of the parts until the clutch is again disengaged after enough rotation to turn the half-revolution shaft through one-half revolution, whereby the half-revolution shaft may be put in a desired one of its two positions by moving the control means in that direction which corresponds to the desired shaft position.

5. A driving shaft, a clutch thereon, a pinion secured to the driven part of the clutch, a half-revolution shaft, a gear on said shaft meshing with said pinion in one-to-three ratio, diametrically opposed pins for cooperating with said clutch, a cam on said half-revolution shaft, diametrically opposed cam followers, said cam followers and clutch pins being arranged to move together, control means connected to said clutch pins and cam followers to disengage one clutch pin and then to engage the other, the cam cooperating with the cam followers to permit such disengagement but to prevent such engagement until the driving shaft has turned one and one-half revolutions, whereupon the clutch is disengaged and locked, reverse movement of said control means causing return movement of the parts until the clutch is again disengaged after one and one-half revolutions, whereby the half-revolution shaft may be put in a desired one of its two positions by moving the control means in that direction which corresponds to the desired shaft position.

6. A driving shaft, a clutch thereon, a pinion secured to the driven part of the clutch, a half-revolution shaft, a gear on said shaft meshing with said pinion in one-to-three ratio, a clutch yoke with diametrically opposed pins for cooperating with said clutch, a cam on said half-revolution shaft, a cam follower yoke with diametrically opposed cam followers, said yokes being arranged to move together, control means connected to said yokes, whereby when the control means is moved in one direction said yokes tend to move in one direction to disengage one clutch pin and then to engage the other, the cam cooperating with the cam followers to permit such disengagement but to prevent such engagement until the driving shaft has turned one and one-half revolutions, whereupon the clutch is disengaged and locked, reverse movement of said control means causing return movement of the yokes until the clutch is again disengaged after one and one-half revolutions, whereby the half-revolution shaft may be put in a desired one of its two positions by moving the control means in that direction which corresponds to the desired shaft position.

7. A driving shaft, an electric motor for driving the same, a clutch on said shaft, a pinion secured to the driven part of the clutch, a half-revolution shaft, a gear on said latter shaft meshing with said pinion in a desired odd-integer reduction ratio, a clutch yoke with diametrically opposed pins for cooperating with said clutch, a cam on said half-revolution shaft, a cam follower yoke with diametrically opposed cam followers, said yokes being connected to move together, control means connected to said yokes whereby when the control means is moved in one direction said yokes tend to move in one direction to disengage one clutch pin and then to engage the other, the cam cooperating with the cam followers to permit such disengagement but to prevent such engagement until the driving shaft has turned enough to turn the half-revolution shaft through one-half revolution, whereupon the clutch is disengaged and locked, reverse movement of said control means causing return movement of the parts until the clutch is again disengaged after enough rotation to turn the half-revolution shaft through a half-revolution, whereby the half-revolution shaft may be put in a desired one of its two positions by moving the control means in that direction which corresponds to the desired shaft position, a motor switch for the aforesaid motor, means operatively connecting said yokes to said switch to close the switch when the yokes are in mid-position corresponding to disengagement of both pins, but to open said switch when the yokes are in either end position corresponding to engagement of one pin or the other.

GORDON B. SAYRE.